United States Patent [19]

Sernka et al.

[11] Patent Number: 5,053,294
[45] Date of Patent: Oct. 1, 1991

[54] PLANAR SODIUM-SULFUR ELECTRICAL STORAGE CELL

[75] Inventors: Richard P. Sernka, Long Beach; Robert K. Taenaka, Granada Hills, both of Calif.

[73] Assignee: Hughes Aircraft Company, Los Angeles, Calif.

[21] Appl. No.: 506,748

[22] Filed: Apr. 10, 1990

[51] Int. Cl.$^5$ .................................... H01M 10/39
[52] U.S. Cl. ................................ 429/104; 429/193
[58] Field of Search ........................ 429/104, 193

[56] References Cited

U.S. PATENT DOCUMENTS

| | | | |
|---|---|---|---|
| 3,533,848 | 10/1970 | Winn | 429/104 X |
| 3,756,856 | 9/1973 | Tennehouse | 429/104 |
| 4,252,869 | 2/1981 | Heitz et al. | 429/104 X |
| 4,800,143 | 1/1989 | Harbach | 429/104 X |
| 4,894,299 | 1/1990 | Morse | 429/104 |

Primary Examiner—Stephen J. Kalafut
Attorney, Agent, or Firm—Robert A. Westerlund; Steven M. Mitchell; Wanda K. Denson-Low

[57] ABSTRACT

A sodium-sulfur electrical storage cell (10) has a planar solid electrolyte (16) that is permeable to sodium ions, a planar permeable porous cathode (24) filled with sulfur, a planar permeable porous anode (28) filled with sodium, and an electrically nonconducting, closed flat container (12) for these elements. The electrolyte (16) is thin and strengthened, as by an integral supporting structure (22), or supported, as by a structural anode core structure (36) or by cross members (22) of the container, to minimize its deformation during operation. The anode (28) and cathode (24) are electrically conducting even without sodium and sulfur present, so that the cell (10) fails to a shorted state.

21 Claims, 4 Drawing Sheets

PLANAR SODIUM-SULFUR ELECTRICAL STORAGE CELL

BACKGROUND OF THE INVENTION

This invention relates to electrical storage cells, and, more particularly, to a planar sodium-sulfur storage cell having a high energy storage density.

Rechargeable cells are electrochemical devices for storing and retaining an electrical charge and later delivering that charge as useful power. A number of such cells are typically connected together electrically to form a battery having specific voltage or current delivery capability. Familiar examples of the rechargeable cell are the lead-acid cell used in automobiles and the nickel-cadmium cell used in portable electronic devices such as cameras. Another type of cell having a greater storage capacity for its weight is the nickel oxide pressurized hydrogen cell, an important type of which is commonly called the nickel-hydrogen cell and is used in spacecraft applications.

Yet another type of cell is the sodium-sulfur cell, which has been under development for about 20 years for use in a variety of terrestrial applications such as nonpolluting electric vehicles. The sodium-sulfur cell has the particular advantage that its storage capacity per unit weight of cell is several times the storage capacity of the nickel-hydrogen cell. The sodium-sulfur cell therefore is an attractive candidate for use in spacecraft applications.

The most common type of construction for a sodium sulfur cell includes a cylindrical metal outer housing which serves as a positive terminal and a cylindrical shell of an alumina-based ceramic within the outer housing. Sodium is placed into a first or inner chamber formed within the alumina shell, and sulfur is placed into a second chamber formed between the alumina shell and the outer housing. The cell is heated to a temperature of about 350 C., at which temperature both the sodium and the sulfur are molten. The liquid sodium acts as the anode of the cell, the liquid sulfur acts as the cathode, and the solid ceramic acts as the electrolyte. Electrical energy is released when sodium ions diffuse through the ceramic into the sulfur, thereby forming sodium polysulfides. Electrical energy can be stored when the process is reversed, with an applied voltage causing the sodium polysulfides to decompose to yield sodium and sulfur, and the sodium ions diffuse through the ceramic electrolyte back into the first chamber.

Planar sodium-sulfur cells have also been developed. The term "planar" is used in this context to mean that the geometry of the cell is larger in lateral extent relative to its height, as compared with the cylindrical cell, and that the anode and cathode are generally planar. The planar design has the advantage that the active area of electrolyte is relatively larger per unit weight of cell than for a cylindrical design. Planar sodium-sulfur cells are disclosed in U.S. Pat. Nos. 3,765,945 and 3,783,024, for example.

The sodium sulfur cell is under consideration for many applications requiring a high capacity of electrical energy storage, such as electrically powered automobiles. It has not as yet found widespread use because of the state of development of such electrically powered vehicles, and because of engineering problems associated with the operation of the cell at elevated temperatures in a vehicle.

The sodium-sulfur cell is also a candidate for use in energy storage for spacecraft such as communications satellites. A satellite orbiting the earth is exposed to intense sunlight and then plunged into shadow in a periodic manner. In some satellites, electrical energy to power the systems on board the satellite is created by solar cells that function when the satellite is in sunlight, and a portion of the electrical energy so generated is stored in electrical storage cells. The stored energy is then available for use when the satellite is in the earth's shadow or for peak power demands, by discharging the cells.

Neither cylindrical nor planar sodium-sulfur cells have been extensively used in spacecraft and terrestrial applications as yet because of a number of problems, including their reliability and failure mechanisms. Many existing designs have promise in such applications, but have not been demonstrated to reliably display sufficient operating lives, and upon failure would render inoperable a battery incorporating the cell if mechanical bypass protection were not provided in the battery design.

There is a need for an improved sodium-sulfur storage cell having a high energy storage density and a favorable failure mode that does not render the entire battery inoperable. The present invention fulfills this need, and further provides related advantages.

SUMMARY OF THE INVENTION

The present invention provides a sodium-sulfur electrical storage cell, and a battery made from such cells, that has a high energy storage capacity per pound of weight of the cell. The cell is constructed to resist damage from mechanical loadings such as vibration, and, upon failure, to fail to a shorted state so that a battery containing the cell is not rendered inoperable. The cell of the invention is suitable for use in terrestrial vehicle and spacecraft applications.

In accordance with the invention, a planar sodium-sulfur electrical storage cell comprises a solid electrolyte which permits the migration of sodium ions therethrough; a substantially planar, electrically conductive, liquid permeable porous cathode on one side of the electrolyte, the cathode having sulfur within the pores thereof; a sodium-containing anode on the other side of the electrolyte, the anode and the cathode being of substantially the same cross sectional area as the electrolyte; an electrically nonconductive container around the electrolyte, the cathode, and the anode, the electrolyte being sealed to the container to prevent any flow of matter from the anode to the cathode other than through the electrolyte; means for preventing damage to the electrolyte from mechanical loading of the electrolyte; and electrically conductive end closure means for closing at least one end of the container.

The storage cell of the invention can be electrically connected together with other similar storage cells to form a battery that delivers either high voltage or high current. A stacked arrangement of the cells with a bipolar end closure at one end of each cell provides a particularly weight-efficient battery.

In accordance with this aspect of the invention, a battery comprises at least two planar sodium-sulfur electrical storage cells in a stacked end-to-end arrangement, each cell having an electrolyte, a cathode including sulfur on one side of the electrolyte, an anode including sodium on the other side of the electrolyte, a container that contains the electrolyte, the anode, and the cathode, and an end closure plate on one end of the container, each cell including therein means for causing the cell to conduct electricity therethrough in the event of a loss of energy storage capability, thereby avoiding the need for external circuitry to isolate the cell in the event of a loss of energy storage capability.

The storage cell of the invention provides a significant advance in the art of storing and delivering large amounts of electrical power with minimal cell weight. Other features and advantages of the invention will be apparent from the following more detailed description of the preferred embodiment, taken in conjunction with the accompanying drawings, which illustrate, by way of example, the principles of the invention. Throughout the figures, like reference numerals designate like elements.

DETAILED DESCRIPTION OF THE INVENTION

In accordance with the invention, a planar sodium-sulfur electrical storage cell comprises a solid electrolyte which permits the migration of sodium ions therethrough; a substantially planar, electrically conductive, liquid permeable, porous cathode on one side of the electrolyte, the cathode having sulfur within the pores thereof; a substantially planar, electrically conductive, liquid permeable, porous anode on the other side of the electrolyte, the anode having sodium within the pores thereof; an electrically nonconductive container around the electrolyte, the cathode, and the anode, the electrolyte being sealed to the container to prevent any flow of matter from the anode to the cathode other than through the electrolyte; and end closure means for closing at least one end of the container.

The storage cell of the invention is a "planar cell", which is a term of art referring to an electrical storage cell whose height is relatively short compared to its lateral dimension. The height of the planar cell is less (and usually much less) than its lateral dimension, which is the cylindrical diameter in the most preferred embodiment. In the presently preferred configuration, the planar cell is a disk having a height of about 9/16 inch and a cylindrical diameter of as much as 6⅜ inches.

The planar cell geometry is selected to produce important benefits not attainable with conventional sodium-sulfur cells that are generally cylindrical with a height greater than their lateral dimension. As will be apparent from the following description, the planar cell permits a relatively large planar electrolyte area for the cell weight, but to attain the full advantages the electrolyte must be kept very thin, preferably on the order of 0.025 inches or less in thickness. The electrolyte is selected to be this thickness to maintain the internal impedance of the cell as low as possible. A conventional tubular cylindrical sodium sulfur cell has an internal impedance of about 7–10 milliohms, so that the delivered voltage drops significantly if the energy contained in the cell is discharged at a high rate. By use of a thin electrolyte, on the order of about 0.016 to about 0.020 inches thick, and the short conduction paths and large cross-sectional area of the planar configuration, the cell impedance is reduced to about 1 milliohm. The cell thereby achieves a high energy storage density and high power, with low heat production and dissipation requirements. It may therefore be possible to make a battery that is powerful and requires no external active cooling system.

The construction of such a cell requires significant structural innovation. An electrolyte plate made of brittle material and of dimensions 0.020 inches thickness and over 6 inches diameter is quite fragile. An important aspect of the design of the present planar cell is to attain the full benefits of a very thin planar electrolyte in a planar cell configuration, which is able to withstand the loadings that accompany normal use in automotive, spacecraft, and other applications.

Another aspect of the design of the present invention is an approach that permits failure of the cell to a closed-circuit, current carrying configuration. If one cell of a multiple-cell battery were to fail, the battery itself would remain operable but with reduced voltage or capacity due to the failure of the one cell. Such a failure mode is a necessity for most practical applications.

Figure 1:
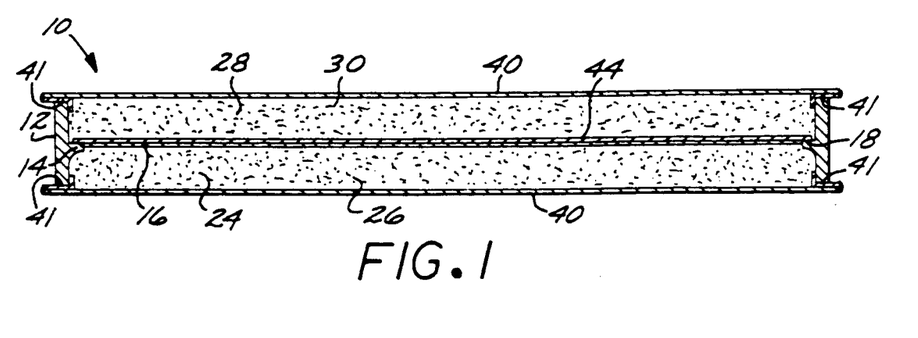
FIG. 1 is a side sectional view of a storage cell of the invention.
Figure 2:
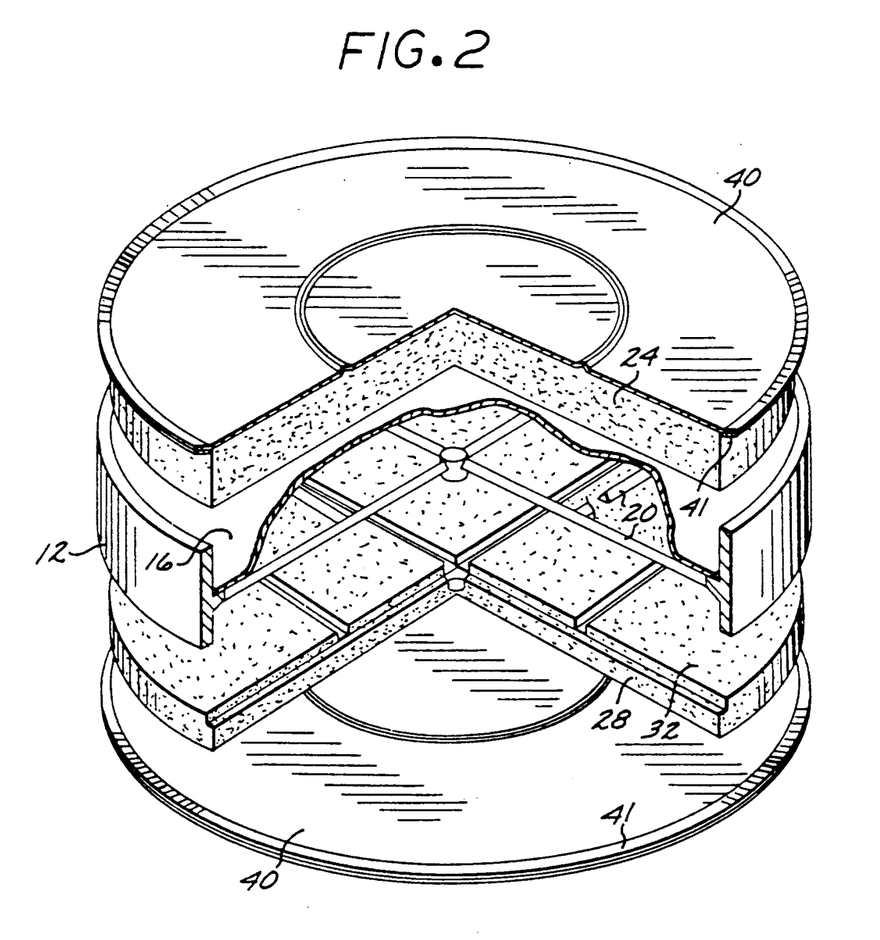
FIG. 2 is a perspective exploded view of a planar sodium-sulfur cell utilizing one approach for preventing mechanical damage to the electrolyte.
Figure 3:
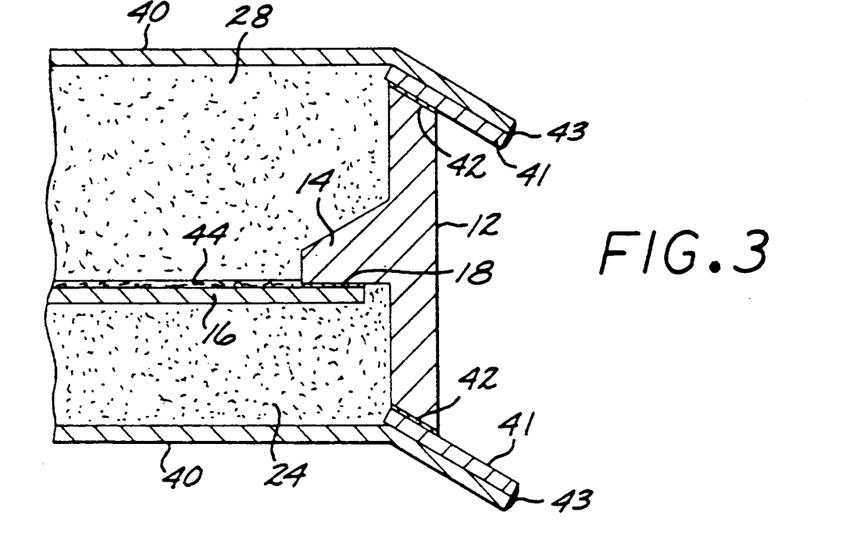
FIG. 3 is a detail of FIG. 1.

FIG. 1 illustrates in section a storage cell 10 made in accordance with the invention, FIG. 2 shows the cell 10 in perspective exploded view, also illustrating a cross bracing approach for supporting the electrolyte, and FIG. 3 illustrates the details of construction of the storage cell 10. The cell 10 includes a container 12 that is preferably a right circular cylinder whose length is short compared to its cylindrical diameter. The container 12 has a support ledge 14 extending a short distance radially inwardly at an intermediate location along its length. The container 12 is made of an electrically nonconducting material, preferably a ceramic, and most preferably alpha aluminum oxide.

Supported on the ledge 14 is a thin piece of a ceramic electrolyte 16. The electrolyte 16 is a ceramic material that permits the rapid diffusion of sodium ions therethrough. In its most preferred form, the ceramic electrolyte 16 is beta double prime alumina of a composition of about 90 percent aluminum oxide, 9 percent sodium oxide, and 1 percent lithium oxide. (All compositions herein are in percent by weight, unless otherwise indicated.) The present invention is not limited to any particular composition of electrolyte, however. The electrolyte 16 is sealed to the ledge 14 of the container 12 using a glass seal 18, so that matter must pass through the electrolyte 16 to move from one side of it to the other.

To attain the minimal internal electrical resistance within the cell 10, the electrolyte 16 should be as thin as possible. The electrolyte 16 is preferably less than 0.025 inches in thickness, more preferably is about 0.016 to about 0.020 inches in thickness, and most preferably is about 0.020 inches in thickness. A plate of this thickness, made of a brittle material such as alumina, has a mechanical strength too small to withstand the stresses, strains, and mechanical shocks that occur during normal use of the cell.

Figure 5:
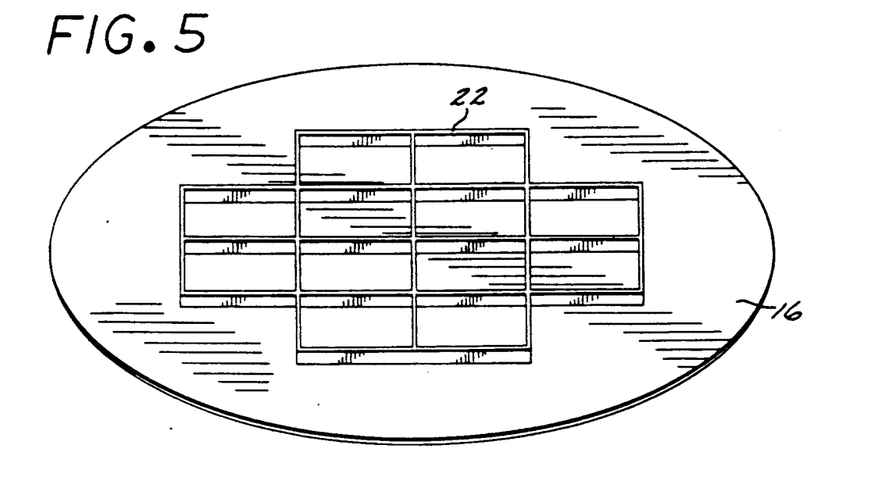
FIG. 5 is a perspective view of a ribbed electrolyte.
Figures 6, 7:
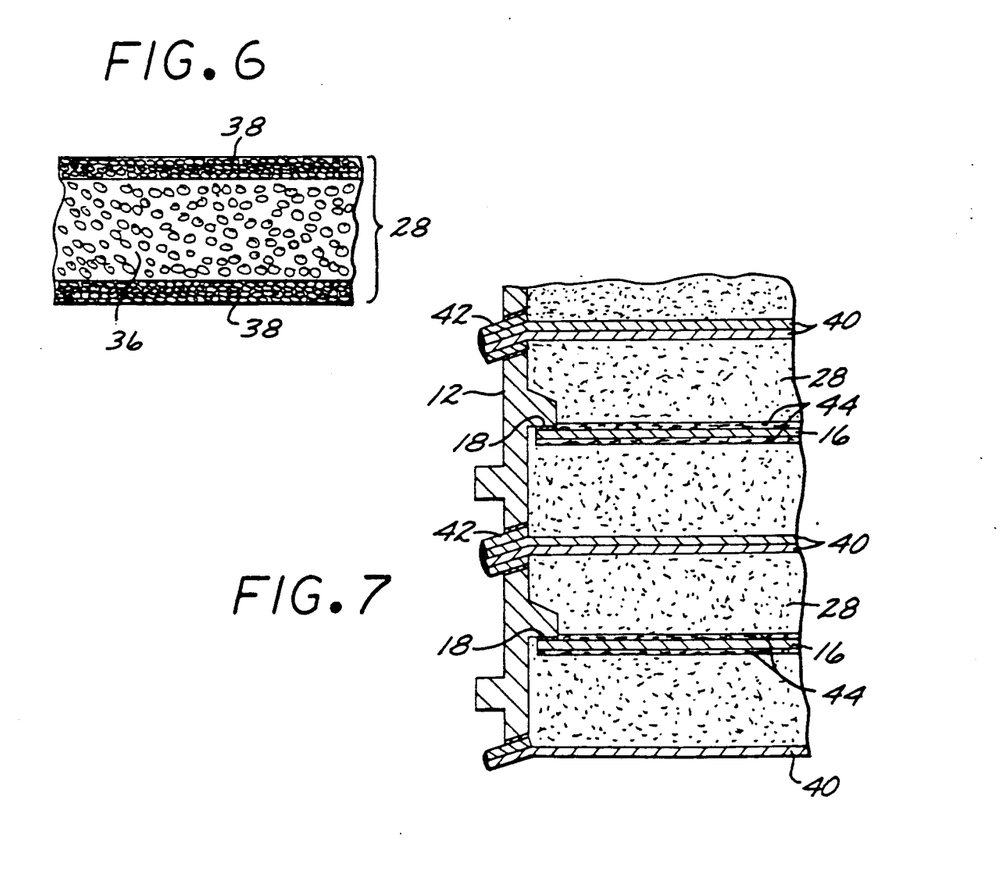
FIG. 6 is a side elevational view of a structural anode.
FIG. 7 is a side sectional view of a storage cell, illustrating an alternative approach to joining cells to form a battery.

There are several ways to provide support to the electrolyte 16 and reduce the possibility that it will be mechanically damaged during use. One such approach is shown in FIG. 2, where there are several cross members 20 formed in the container 12 and extending across the space within the container 12 to form a meshed supporting surface upon which the electrolyte 16 rests. Another approach is illustrated in FIG. 5, where the electrolyte 16 is provided with ribs 22 that increase its structural strength. Yet another approach is illustrated in FIG. 6, where the anode is made with sufficient structural strength to support the electrolyte 16.

Returning to FIGS. 1-3, on one side of the electrolyte 16 is a cathode 24. The cathode 24 includes a porous mat 26 of electrically conductive graphite fibers. Elemental sulfur is cast into the mat 26, and the sulfur melts at a temperature below the operating temperature of the cell 10. The packing density of graphite fibers in the mat 26 is such that the sulfur (and the sodium polysulfide produced during electrical storage), when molten, is free to flow through the mat 26. The mat of fibers provides electrical conductivity through the cathode 24.

On the other side of the electrolyte 16 is an anode 28. The anode 28 includes an electrically conducting, sodium permeable, and porous structure 30. Sodium is cast into the anode structure 30, and becomes a liquid upon reheating to the operating temperature of the cell 10 (about 325°-350° C.). The porous structure 30 of the invention provides an electrical conduction path through the cell 10 in the event that it no longer is functional. (The porous anode structure 30 also provides structural strength to resist deformation of the cell 10 in some embodiments, such as shown in FIG. 6.) Thus, the cell 10 fails to a closed circuit state, so that a battery containing the failed cell will lose only the capability of the failed cell and will not be totally disabled.

One such porous structure 30 contains a mesh of metallic fibers and/or powders 32 at its exterior, as illustrated in FIG. 2. Nickel is preferred as the material of construction, because nickel is not attacked by liquid sodium. The nickel is also malleable so as to conform to dimensional irregularities as may occur within the cell. Other materials, such as stainless steel, iron, aluminum, and carbon can also be used, as can porous, conductive ceramics such as rutile in some embodiments. A low density material which is wetted by sodium, such as graphite or metal wool, aids in the transport of sodium from the interior to the exterior of the porous structure 30. In the case of nickel, the nickel fibers are preferably about 0.002-0.005 inches in diameter and are woven or pressed into a mesh with a pore size of about 4 to about 10 micrometers diameter. This pore size has the important advantage that it permits the flow of sodium during normal operation. If there is a cell structural failure, such as rupture of the electrolyte, the pores plug as sodium combines directly with sulfur to form sodium sulfide, $Na_2S_2$ or $Na_2S$, which is solid at the cell operating temperature of about 350° C., thereby preventing a catastrophic overheating of the cell.

The fiber/powder nickel structure anode 28 normally does not have sufficient structural strength to fully support the thin electrolyte and fully protect it from damage. In this case, either the cross-member approach of FIG. 2 or the ribbed electrolyte approach of FIG. 5 is used to provide sufficient structural support for the electrolyte 16.

The anode 28 can be made of a material that is sufficiently rigid to provide structural support to the electrolyte, so that the electrolyte need not be ribbed and there need be no cross bracing. As shown in FIG. 6, the anode 28 may be made of a rigid structural, porous, electrically conductive material such as reticulated vitreous carbon. Reticulated vitreous carbon is a porous form of vitreous carbon which is about 95 percent porous. That is, the material is similar to an open-celled sponge in appearance, except that the cell walls are electrically conductive carbon. It is light in weight, permits the containment within and flow therethrough of sodium, is not corroded by sodium, sulfur, or sodium sulfide, and conducts electricity within the cell walls. In the preferred form of such material used for the anode 28, the material has a 95 percent porous core structure 36 that contains the majority of the sodium, and surface layers 38 of the same material but densified to be about 20-30 percent porous. The porous core material 36 is available commerically from Energy Research and Generation, Inc., Oakland, Calif.

Another feature to improve the electrical conductivity through the cell 10 in the event of failure of the electrolyte is shown in FIG. 1, and in more detail in FIG. 3. A thin layer 44 of graphite fibers, each about 0.050 to about 0.100 inches long, is placed between the anode 28 (whatever its type) and the electrolyte 16. (As shown in an alternative embodiment of FIG. 4, the thin layer 44 of graphite fibers may additionally or alternatively be placed between the cathode 24 and the electrolyte 16.) The length of the graphite fibers is greater than the thickness of the electrolyte 16. If the electrolyte 16 fails structurally as by cracking, sodium will flow from the anode 28 through the crack and into the region of the cathode 24. In the design of the invention, the loose graphite fibers of the layer 44 flow through the crack in the electrolyte 16 along with the sodium and lodge in the crack, providing a conductive path through the crack. The conductive path of the graphite fibers from the layer 44, together with the graphite fibers of the cathode 24 and the electrically conductive anode 28, provide an internal current path through the cell 10 even in the event of the loss of all of the sodium and the sulfur of the cell.

In discharge of the cell 10, sodium cations diffuse through the electrolyte 16 from the anode 28 toward the cathode 24. Upon reaching the cathode 24, the sodium cations combine with sulfur anions at, and immediately adjacent to, the surface of the electrolyte 16.

The half-cell reactions for discharge are $$2Na = 2Na^+ + 2e^-$$

$$xS + 2e^- = (S_X)^{-2}.$$

The total reaction of the cell is therefore $$2Na + xS = Na_2S_x.$$

The electrons flow through an external circuit during the reaction. The reaction is presented in this manner because the sodium polysulfide $Na_2S_x$ may be present in several forms, depending upon the degree of discharge of the cell 10. With increasing degrees of discharge, the sequence of the bulk sodium polysulfide $Na_2S_x$ produced is $Na_2S_5$, $Na_2S_4$, and $Na_2S_3$.

Charging of the cell with an externally applied voltage and current involves the reverse reactions.

Figure 4:
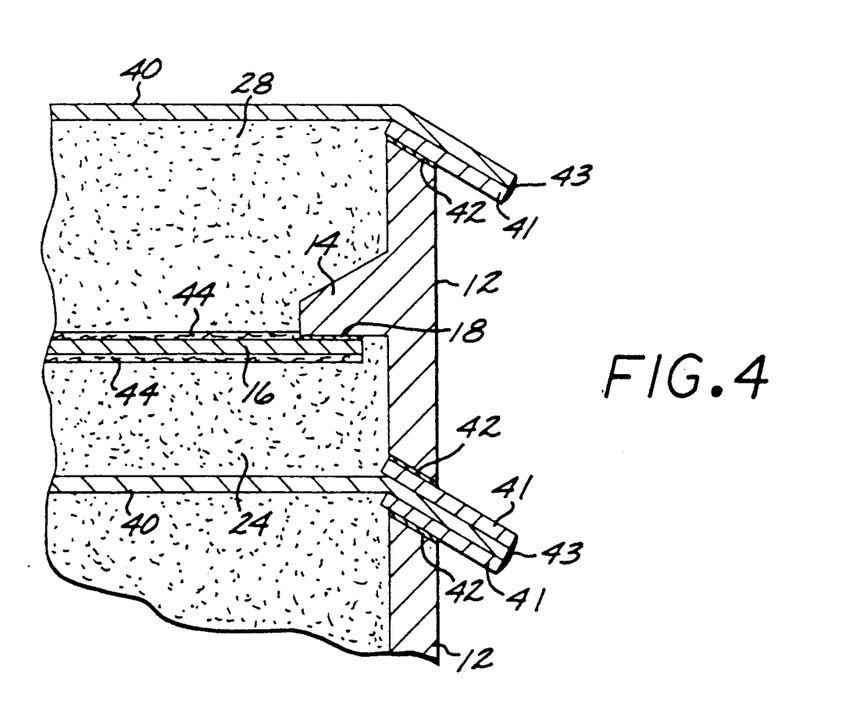
FIG. 4 is a side sectional view of a storage cell in the same view as FIG. 3, illustrating an alternative embodiment for the cell.

At least one end of the container 12 is sealed with a plate 40 made of a sheet of a material that may be either electrically insulating or conducting, depending upon how the cell 10 is used. If a conducting plate 40 is desired, metal or carbon plates may be used, with the preferred material of construction being molybdenum, low carbon steel, or stainless steel, about 0.015–0.040 inches thick. If a nonconducting plate 40 is desired, the preferred material of construction is alpha aluminum oxide, about 0.020–0.050 inches thick. One end of each cell can be sealed, with the sealing of the other end provided by the end plate of the next cell stacked together to form a battery, as illustrated in FIG. 4. Alternatively, both ends of each cell are sealed, as the slight additional weight is compensated for by reduced risk of leakage and system failure, see FIG. 7.

A key to the successful fabrication of the cell 10 is the sealing of the electrolyte 16 and the end plate or plates 40 to the container 12. Some prior designs of planar sodium-sulfur cells were made impractical by the absence of a suitable sealing procedure, and required, for example, a heavy external structure to hold the cell together. Here, the electrolyte 16 is sealed to the ledge 14 of the container 16 by a graded seal or glass seal 18, illustrated in FIGS. 1, 3, 4, and 7.

The cell 10 is sealed by the welding of the plate 40 to a metal weld ring 41 sealed to the end rims of the container 12 by a seal 42. The weld rings must be made of a material having welding compatibility with the material of the plate 40, and must have thermal expansion characteristics compatible with the strength of the seals that attach them to the container 12. An external weld 43 then seals the plate 40 to the weld ring 41, see FIG. 3. When two cells 10 are stacked together to form a battery, the cells 10 are joined by the external weld 43 that extends between the adjacent weld rings 41 and includes the plate 40, as shown in FIG. 4.

The weld ring 41 is sealed to each end of the container 12 using the technique appropriate for the particular weld ring and container materials being used. A primary consideration in selecting the sealing approach is the thermal expansion difference between the weld ring and the container. Steel has an expansion coefficient of about $11 \times 10^{-6}$/C, aluminum oxide an expansion coefficient of about $7.5 \times 10^{-6}$/C, and molybdenum about $5.8 \times 10^{-6}$/C. The seal should provide a gas-tight joint but not fail when the cell and seal are repeatedly heated and cooled.

For a molybdenum weld ring 41 and an alpha aluminum container 12, the seal 42 is preferably accomplished by a graded plasma spray seal approach. A layer of aluminum oxide is vacuum plasma sprayed onto the ends of the container 12. A subsequent layer is aluminum oxide with a small amount of molybdenum. Subsequent layers have an increasing amount of molybdenum, until the last layer is entirely molybdenum. The molybdenum weld ring 41 is then joined directly to the last layer in an inert gas such as nitrogen or argon, using conventional techniques. Diffusion bonding may also be used to join the molybdenum plate to the molybdenum layers of the graded seal.

Alternatively, a glass ceramic-to-metal seal can be used. This seal must have a coefficient of thermal expansion compatible with those of the weld ring 41 and the container 12 materials, adequate mechanical strength in shear and compression, and resistance to corrosion attack from sodium and sodium sulfides. One such seal which meets these requirements has a composition of about 35 weight percent boron oxide, 20 weight percent barium oxide, 10 weight percent magnesium oxide, 10 weight percent silicon dioxide, and 25 weight percent aluminum oxide. A multilayer glass seal can also be used, whereby glass compositions with varying coefficients of thermal expansion are layered onto the seal surface to form a gradual transition of coefficient of thermal expansion from that of the container 12 to that of the weld ring 41. A lip on the weld ring 41 glass-sealed to the side of the container 12 (on the inside of the container 12 in the case of molybdenum and on the outside of the container 12 in the case of steel) takes advantage of material expansion coefficient differences to provide a glass seal surface which is in compression at all times following the sealing operation. The seals discussed here permit the necessary liquid-tight seals to be formed without adding excessive weight to the cell 10 and a battery formed from multiple cells.

The open cell voltage of a sodium-sulfur cell is about 2.0 volts, and the discharge voltage at low-earth-orbit rates is about 1.8 volts. These voltages are determined by the electrochemistry of the reaction, and cannot be changed significantly. To attain higher voltages, a number of cells are connected in series to form a battery. To attain higher discharge currents than possible from a single cell, a number of cells are connected in parallel to form a battery.

Figure 8:
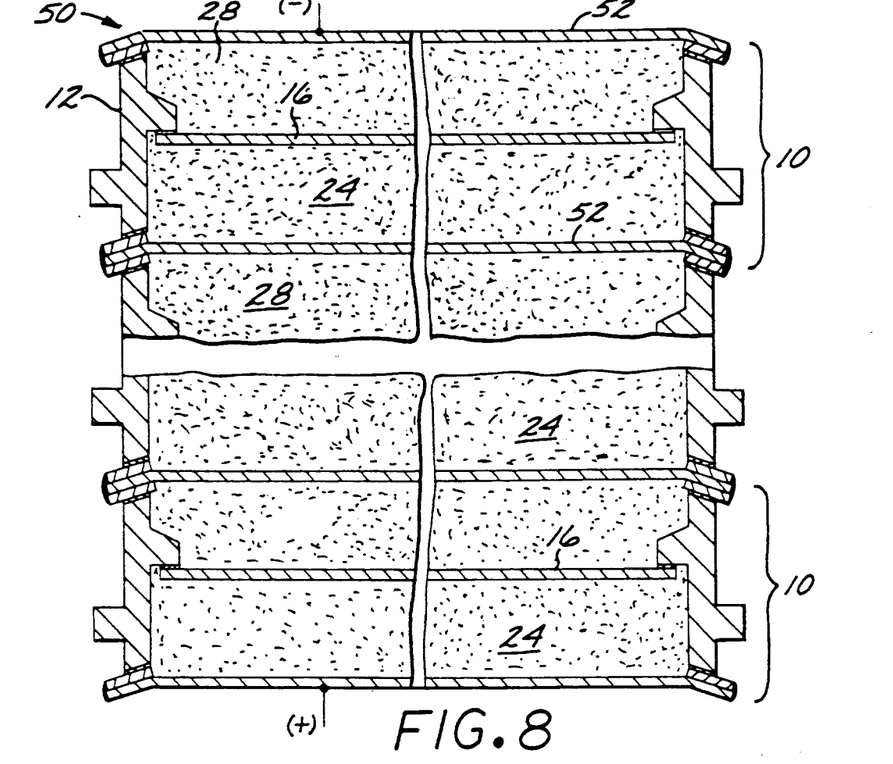
FIG. 8 is a side sectional view of a series connected battery using the cells of the invention.

The cells of the present invention are particularly well suited to connection in series to deliver higher voltages, and a series battery 50 formed from a group of cells 10 is illustrated in FIG. 8. The cells 10 are as previously described, except that they have only a single electrically conducting, bipolar end plate 52 between each pair of cells 10. That is, the anode of one of the cells will be closed by a plate 52. Immediately on the other side of the plate 52 is the cathode of the next cell. The series electrical connection is made from the anode of the first cell, through the plate 52, and to the cathode of the second cell, without the need for external wiring that might add to the electrical resistance of the battery 50. The voltage produced by the battery 50 is approximately equal to the voltage produced by any one cell, times the number of cells connected in series in this manner. The current delivered is approximately the same as that delivered by a single cell, which is determined by the lateral size and cross sectional electrolyte area of the cell.

Figure 9:
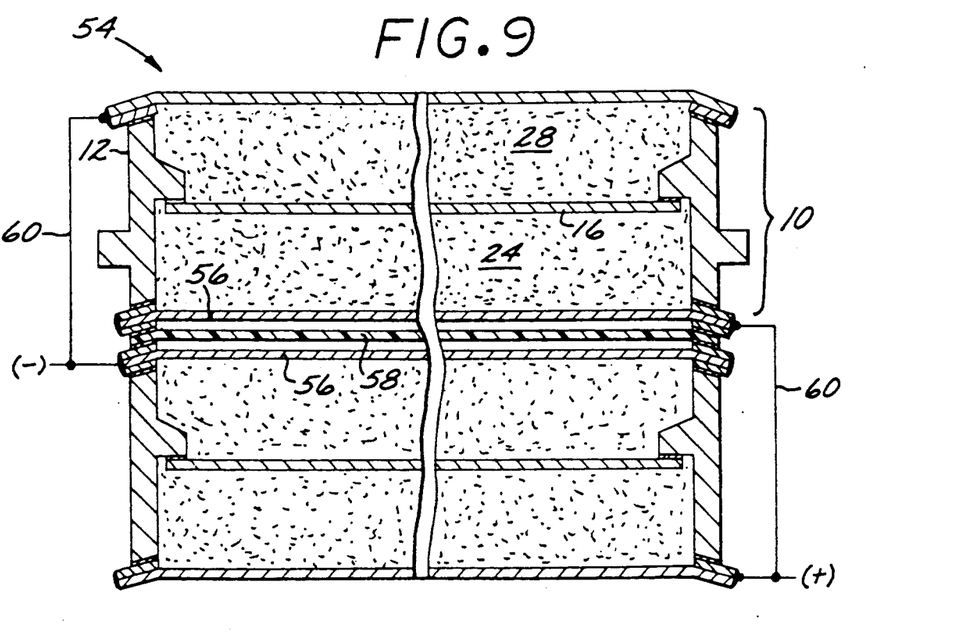
FIG. 9 is a side sectional view of a parallel connected battery using the cells of the invention.

A parallel connected battery 54 formed from cells 10 is illustrated in FIG. 9. The cells 10 are similar to those discussed previously, except that in this illustrated embodiment the end plates 56 are made of nonconducting material such as alpha aluminum oxide, and a metallization layer 58, such as a grid of wires, is disposed intermediate adjacent end plates 56. The electrical charge from the anode and cathodes are collected on the respective sides of the plate 56, and conducted to an external circuit through external wiring 60. The current delivered by the parallel wired battery 54 of FIG. 8 is approximately equal to the current delivered by any one cell, times the number of cells. The current is delivered at the cell voltage, 2.0 volts open circuit or 1.8 volts during discharge at low-earth-orbit rates.

A feature of both the series and parallel batteries is that the failure of a single cell in the battery will not cause failure of the entire battery. For example, if a leak were to develop and the sodium were lost from one cell, the remaining individually sealed cells would not be affected. Moreover, the anode and cathode of the failed cell are electrically conducting even without the presence of sodium and sulfur, respectively, so that the battery behaves as though the previously operational cell were replaced by a conducting wire. The voltage of the series-connected cells would be diminished by the voltage of the failed cell plus the resistive voltage drop across the failed cell, and the energy delivered by the parallel-connected cells would be diminished by the storage capacity of the failed cell. However, the battery in each case can be overdesigned according to statistical failure principles so that the battery with a failed cell still meets its required performance. Thus, for example, if statistical failure studies were to predict that there would be one cell failure in a 5 year mission, the battery would contain an extra cell to account for this possibility. Voltage regulation is accomplished by a voltage regulator in an external circuit.

The closed circuit failure mode of the cells of the present invention allows a significant reduction in the external electrical control and circuitry required for conventional batteries where the sodium-sulfur cells that fail to an open circuit condition. If the cells of a series-connected battery fail to an open circuit condition, the entire battery function is lost. To avoid this possibility, complex external circuitry to sense the state of each cell is normally provided, where the cells fail to an open circuit state. If one cell fails, a bypass circuit is closed that provides a closed circuit around the failed cell. The present cells, which fail to a closed circuit state, avoid the need for such external circuitry.

More complex series and parallel arrangements of cells can be constructed to deliver the required voltage and current for particular applications.

A baseline series-connected battery 50 has been designed using bipolar end plates. The battery has 16 cells to deliver 28 volts, with one cell redundancy to account for a possible failure. The battery has a cylindrical diameter of 6.65 inches, a length of 9.0 inches, and a weight of 19.5 pounds. With operation between 10 percent and 100 percent (i.e., discharge of 90 percent of theoretical capacity) depth of discharge, the capacity of the battery is 90 ampere-hours. The available specific energy is 140–150 watt-hours per pound, and the available maximum power density is 250 watts per pound. By comparison, a convention nonplanar, tubular sodium sulfur battery has a specific energy of about 80 watt-hours per pound, and a maximum power density of 100–120 watts per pound. Additionally, the planar cell of the present invention has a low internal impedance, permitting rapid discharge without the need for an active cooling system. The conventional tubular or cylindrical cell has a higher internal impedance by a factor of about 4–8. Finally, the planar cell fails to a closed circuit, current carrying configuration, while the conventional cell fails to an open circuit configuration and requires external bypass circuitry.

In another comparison, a nickel-hydrogen battery sized to supply the power for a typical large communications satellite weighs about 300 pounds. It can be replaced by a planar sodium sulfur battery of the present invention that weighs 48 pounds. Since the cost of lifting one pound to orbit is presently about $20,000, this substitution saves about $5 million per launch or, alternatively, permits extra payload of substantially greater value to be carried.

Thus, the improved planar sodium-sulfur cell of the invention provides an important advance that makes such cells practical in battery operation. Although particular embodiments of the invention have been described in detail for purposes of illustration, various modifications may be made without departing from the spirit and scope of the invention. Accordingly, the invention is not to be limited except as by the appended claims.

What is claimed is:

1. A planar sodium-sulfur electrical storage cell, comprising:
   a solid electrolyte which permits the migration of sodium ions therethrough;
   a substantially planar, electrically conductive, liquid permeable, porous cathode on one side of the electrolyte, the cathode having sulfur within the pores thereof;
   a substantially planar, electrically conductive, liquid permeable, porous anode on the other side of the electrolyte, the anode having sodium within the pores thereof;
   an electrically nonconductive container around the electrolyte, the cathode, and the anode, the electrolyte being sealed to the container to prevent any flow of matter from the anode to the cathode other than through the electrolyte, said nonconductive container including internal cross bracing adjacent the electrolyte to minimize deflection of the electrolyte; and
   end closure means for closing at least one end of the container.

2. The storage cell of claim 1, wherein the anode is formed as a metallic mesh having sodium within the open spaces of the mesh.

3. The storage cell of claim 1, wherein the anode is formed of a structurally rigid material.

4. The storage cell of claim 1, wherein the anode is formed of reticulated vitreous carbon.

5. The storage cell of claim 1, wherein the electrolyte is made of beta double prime alumina.

6. The storage cell of claim 1, wherein the electrolyte is less than about 0.025 inches thick.

7. The storage cell of claim 1, wherein the electrolyte is from about 0.016 to about 0.025 inches thick.

8. The storage cell of claim 1, wherein the cathode is formed as an electrically conductive graphite mat with sulfur within the pores of the mat.

9. The storage cell of claim 1, wherein the end closure means is a metal plate selected from the group consisting of molybdenum, steel, and carbon.

10. The storage cell of claim 1, wherein the end closure means includes a weld ring joined to the container by a seal that includes a graded composition seal.

11. The storage cell of claim 1, wherein the end closure means includes a weld ring joined to the container by a seal that includes a glass seal.

12. The storage cell of claim 1, wherein the anode and the cathode have substantially the same cross sectional areas.

13. The storage cell of claim 1, further including a layer of loose graphite fibers between the anode and the electrolyte.

14. A planar sodium-sulfur electrical storage cell, comprising:

a solid electrolyte which permits the migration of sodium ions therethrough;

a substantially planar, electrically conductive, liquid permeable porous cathode on one side of the electrolyte, the cathode having sulfur within the pores thereof;

a sodium-containing anode on the other side of the electrolyte, the anode and the cathode being of substantially the same cross sectional area as the electrolyte;

an electrically nonconductive container around the electrolyte, the cathode, and the anode, the electrolyte being sealed to the container to prevent any flow of matter from the anode to the cathode other than through the electrolyte;

means for preventing damage to the electrolyte from mechanical loading of the electrolyte, including structural cross members across the interior of the container; and electrically conductive end closure means for closing at least one end of the container.

15. The storage cell of claim 14, wherein the anode is an electrically conducting, porous structural member containing sodium in the pores.

16. The storage cell of claim 14, wherein the means for preventing damage includes the use of a structurally rigid anode.

17. A battery, comprising: at least two planar sodium-sulfur electrical storage cells in a stacked end-to-end arrangement, each cell having an electrolyte, a cathode including sulfur on one side of the electrolyte, an anode including sodium on the other side of the electrolyte, a container that contains the electrolyte, the anode, and the cathode, and an end closure plate on one end of the container, each cell including therein means for causing the cell to conduct electricity therethrough in the event of a loss of energy storage capability, thereby avoiding the need for external circuitry to isolate the cell in the event of a loss of energy storage capability.

18. The battery of claim 17, wherein the means for causing includes a mass of conducting graphite fibers in the cathode.

19. The battery of claim 17, wherein the means for causing includes an electrically conductive anode.

20. The battery of claim 17, wherein the means for causing includes an electrically conductive cathode.

21. A planar sodium-sulfur electrical storage cell, comprising:

a solid, ribbed electrolyte which permits the migration of sodium ions therethrough;

a substantially planar, electrically conductive, liquid permeable, porous cathode on one side of the electrolyte, the cathode having sulfur within the pores thereof;

a substantially planar, electrically conductive, liquid permeable, porous anode on the other side of the electrolyte, the anode having sodium within the pores thereof;

an electrically nonconductive container around the electrolyte, the cathode, and the anode, the electrolyte being sealed to the container to prevent any flow of matter from the anode to the cathode other than through the electrolyte; and end closure means for closing at least one end of the container.

* * * * *